April 26, 1966 R. A. SOMMER 3,248,512
APPARATUS FOR WELDING METEAL TUBING
Filed Dec. 19, 1963
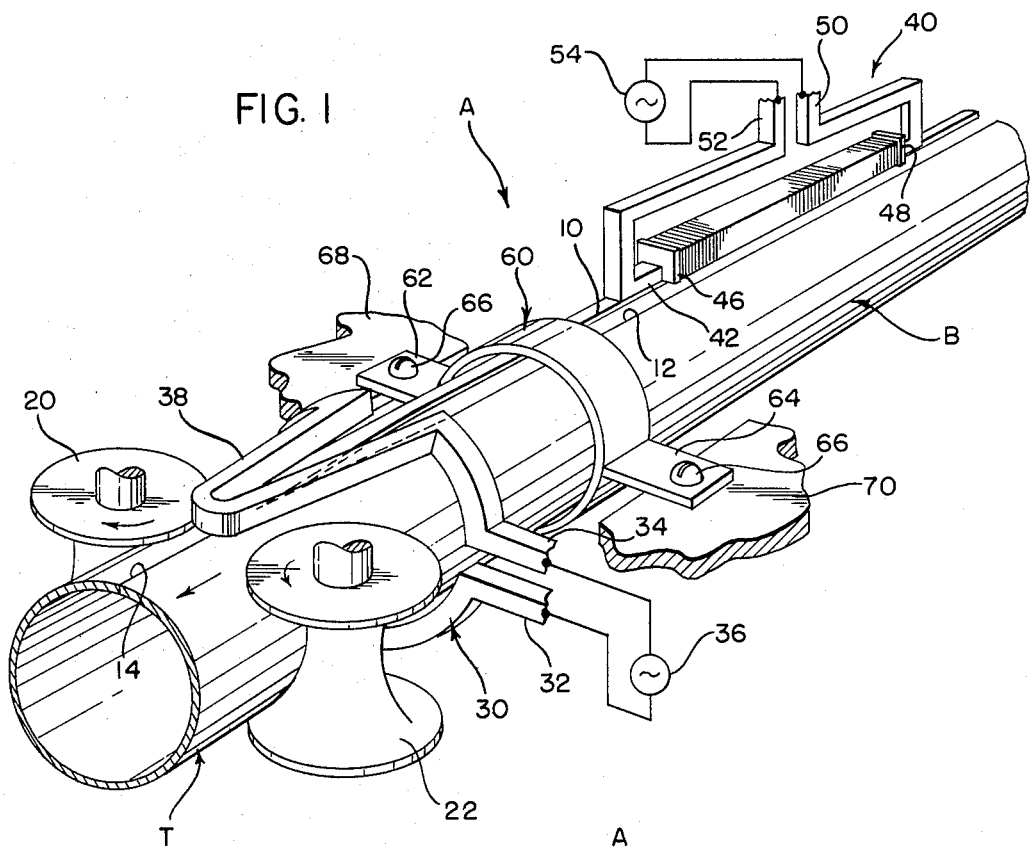
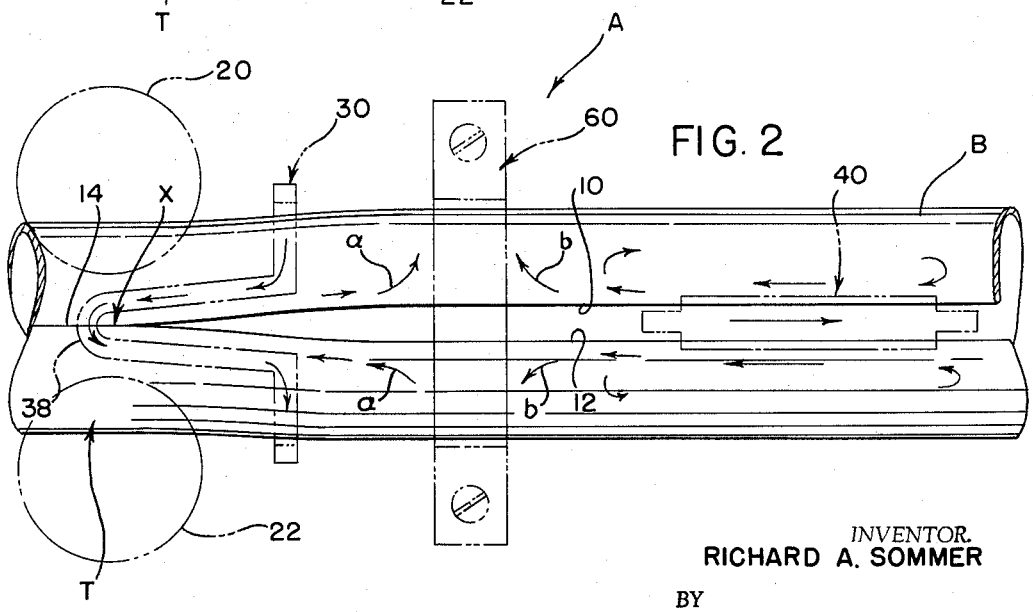
INVENTOR.
RICHARD A. SOMMER
BY
*Tillbury & Brody*
ATTORNEYS

United States Patent Office 3,248,512
Patented Apr. 26, 1966

3,248,512
APPARATUS FOR WELDING METAL TUBING
Richard A. Sommer, Warren, Ohio, assignor to The Ohio Crankshaft Company, Cleveland, Ohio, a corporation of Ohio
Filed Dec. 19, 1963, Ser. No. 331,781
4 Claims. (Cl. 219—8.5)

This invention pertains to the art of induction heating and more particularly to an induction heating apparatus for welding metal tubing.

The invention is particularly applicable to welding the longitudinal seam of thin metal tubing and it will be described with particular reference thereto; however, it will be appreciated that the invention has much broader applications and may be used in welding heavier gauge metal tubing and in welding tubing formed with a spiral seam.

In producing thin walled metal tubing, it is common practice to form the tubing from a longitudinally moving skelp by first progressively forming the skelp around a longitudinal axis so that the edges of the skelp converge and, then, welding the converging edges together into a longitudinal seam. Generally, an inductor driven by a high frequency source is positioned adjacent the point of convergence of the edges for inductively heating the edges to a welding temperature after which the edges are then forced together to complete the welded seam. To produce the desired metallurical characteristics in the welded seam, it is often necessary to preheat the edges of the skelp before they come under the heating influence of the welding inductor. Consequently, many tube mills for producing metal tubing are provided with a preheating inductor positioned in advance of the welding inductor and closely spaced from the edges of the advancing skelp.

This preheating inductor has heretofore been a source of some difficulty. For instance, conductive material, such as scraps and particles of metal from previous operations performed on the skelp, often accumulates around the preheating inductor. The accumulation of conductive material often causes a short circuit between the skelp and the inductor. This is especially true because the spacing between the skelp and the preheating inductor must be quite small to provide the necessary magnetic coupling between the inductor and the skelp edges. This short circuit between the skelp and the inductor, especially when the preheating inductor is close to the welding inductor, allows a portion of the welding current to flow into the preheating inductor. Also, the inductive coupling between the magnetic field of the heating current in the vicinity of the preheating inductor and the preheating inductor itself causes an unbalancing of the preheating supply circuit.

One solution to the problem caused by the short circuit or by the inductive coupling between the skelp and the preheating inductor is the provision of an apparatus for flushing away the scraps and particles of metal from around the preheating inductor; however, such apparatus are expensive, lower the efficiency of the preheating operation, and require considerable space, which is not available when a small tube is being produced.

Aside from the difficulties caused by the short circuit or inductive coupling between the skelp and the preheating inductor, it has been found that the preheating current induced to flow along the edges of the moving skelp tends to also flow in the skelp in the vicinity of the welding inductor. This is especially true when the preheating inductor is spaced only slightly from the welding inductor. The presence of the preheating current in the general vicinity of the welding inductor causes an unbalance of the impedance between the welding inductor and its power source. This impedance unbalance results in a corresponding reduction in the efficiency of the welding operation.

All of these disadvantages caused by the use of a preheating inductor in the tube mill can be easily overcome by the present invention which is directed toward an apparatus for preventing the flow of currents in the skelp between a portion of the skelp adjacent the preheating inductor and a portion of the skelp adjacent the welding inductor which apparatus requires little space, is inexpensive and is easily adapted to existing equipment.

In accordance with the present invention there is provided an improvement in a tube mill of the type adapted to form tubing by welding the converging edges of an advancing skelp which mill comprises a welding inductor adjacent the point of convergence of the edges and a preheating inductor adjacent the edges and in advance of the welding inductor. The improvement according to the present invention comprises a means forming a low resistance or short circuit path across the edges of the skelp and between the inductors by providing a low resistivity band around the skelp and between the inductors.

In this manner, the induced welding current does not flow in the general vicinity of the preheating inductor and the induced preheating current does not flow in the general vicinity of the welding inductor, even though these inductors are spaced only slightly from each other in the tube mill.

It is appreciated that the current flowing within the skelp of a tube mill is not technically induced into the skelp by the inductors. To the contrary, the inductors induce a difference in potential in the skelp which difference in potential causes a current flow through the skelp. Thus, when reference is made to the induced currents within the skelp or tubing, the intermediate step of inducing a voltage difference or a difference in potential within the skelp or tubing has been eliminated for the purposes of simplifying the description.

The primary object of the present invention is the provision of a tube mill for inductively welding metal tubing which includes a welding inductor, a preheating inductor and a device to prevent the flow of current induced by one inductor from a portion of the tubing adjacent that one inductor to a portion of the tubing adjacent the other inductor.

Another object of the present invention is the provision of a tube mill for inductively welding metal tubing which mill includes a welding inductor, a preheating inductor and a short circuit ring around the tubing between the inductors for preventing the flow of current induced from one inductor from a portion of the tubing adjacent that one inductor to a portion of the tubing adjacent the other inductor.

Another object of the present invention is the provision of a tube mill as defined above which mill is durable in use and requires little maintenance.

Still a further object of the present invention is the provision of a tube mill as defined above which is not susceptible to destruction of the preheating inductor by current induced into the tubing by the welding inductor.

Yet another object of the present invention is the provision of a tube mill as defined above which mill is not susceptible to unbalancing of the impedance of the welding inductor by current induced into the tubing by the preheating inductor.

These and other objects and advantages will become apparent from the following description used to illustrate the preferred embodiment of the present invention as read in connection with the accompanying drawing in which:

FIGURE 1 is a pictorial, somewhat schematic view illustrating the preferred embodiment of the present invention; and FIGURE 2 is a top plan view of the advancing skelp illustrating the flow of currents within the skelp caused by the welding and preheating inductors.

Referring now to the drawing wherein the showings are for the purpose of illustrating a preferred embodiment of the invention only and not for the purpose of limiting same, FIGURES 1 and 2 show a tube mill A wherein a rapidly advancing skelp B, having converging edges 10, 12, is formed about a longitudinal axis to produce tubing T. The converging edges 10, 12 are welded together at the point of convergence X into a longitudinally extending welded seam 14. To force the converging edges together, as is common practice, there is provided spaced, contoured pressure rolls 20, 22.

To weld the converging edges 10, 12 at, or adjacent to, the point of convergence X, there is provided a welding inductor 30 surroundnig the advancing skelp B and having power leads 32, 34 connected across a power supply 36. In accordance with the preferred embodiment of the present invention, the power supply has an output with a frequency of approximately 450 kc.; however, it is appreciated that other high frequency power supplies could be used to accomplish the welding operation as will be hereinafter described in some detail.

The general or basic plane of the inductor 30 is spaced from point X and the inductor is provided with a V-shaped nose 38 which nose generally conforms to the shape of the converging edges 10, 12 and extends across the edges adjacent point X. As so far described, high frequency power supply 36 energizes inductor 30 so that a current is caused to flow along the converging edges 10, 12 and across the welding or converging point X. In this manner, the edges are first preheated before reaching point X and then heated at point X to a temperature which will allow them to be welded together by the force exerted between the edges by pressure rolls 20, 22. This type of induction heating and welding of a rapidly advancing skelp is commonly known and further details of this operation are not necessary.

When the skelp B is formed from certain metals, the desired metallurgical characteristics of the welded seam 14 can be accomplished most successfully by preheating the advancing edges 10, 12 to a degree greater than can be accomplished by the nose 38. Consequently, there is provided a preheating inductor 40 having a conductor 42 which is generally parallel with the edges 10, 12 and spaced only slightly therefrom. The length of the conductor 42 depends upon the temperature to which the edges are to be raised, the material being heated, the thickness of the material and the energizing of the conductor. In many cases, this preheating inductor is two feet or more in length to accomplish the desired preheating of the advancing skelp edges.

As is common practice, the conductor 42 is provided with a stack of iron laminations which serve to concentrate the flux field in the edges 10, 12, which lamination stack is supported onto the conductor 42 by spaced end plates 46, 48. It is appreciated that various other flux concentrating arrangements could be used, such as a molded flux concentrator formed from a mixture including ferrite in a plastic matrix.

The conductor 42 is provided with power leads 50, 52 connected across a power source 54. In accordance with the preferred embodiment of the present invention, the power source 54 is a motor-generator set generating a high frequency current, preferably 3 or 10 kc. The frequency of the power source is determined somewhat by the thickness of the skelp B with the higher frequency being used when the skelp has a lesser thickness. It is noted that the preheating inductor 40 is powered by a power supply 54 which generates a current having a high frequency substantially different from the high frequency of the current generated by the power supply 36 of the welding inductor 38. This frequency difference in the power supply causes certain difficulties which will be hereinafter described. As the skelp B is moved toward the pressure rolls 20, 22 (by a conventional mechanism not disclosed) the preheating inductor 40 heats the edges 10, 12. The nose 38 of inductor 30 further preheats the edges as they converge toward point X and, then, the nose ultimately raises the termeprature of the edges at point X to a temperature which will allow pressure welding of the edges into seam 14.

Since the skelp B has been previously formed and trimmed, often scraps and particles of metal accumulate around the conductor 42. This accumulation can cause a short circuit between the conductor and the skelp B. When this happens, the high potential between edges 10, 12 due to the current inducted into the skelp by welding inductor 30 causes a heavy current flow through the shorted conductor 42. This heavy current flow often destroys the inductor 40 and causes a complete shut-down of the tube mill A until the inductor 40 can be replaced. In addition, the structure as so far described allows current inducted into the skelp by the inductor 40 to flow along edges 10, 12 into the general vicinity of inductor 30. This causes an unbalancing of the impedance of inductor 30 and, thus, a mismatch between the impedance of the power supply 36 and the impedance of the inductor 30. This unbalancing of the impedance reduces the efficiency of the welding operation and may destroy the power factor correcting capacitor.

These disadvantages are completely overcome by the present invention which is directed toward a device for preventing the separate currents induced into skelp B by the inductors 30, 40 from flowing into a portion of the skelp adjacent the other inductor. To accomplish this, in accordance with the preferred embodiment of the present invention, there is provided a short circuit ring 60 formed from copper, or other low resistivity material, which ring is provided with diametrically opposed, outwardly extending wings 62, 64. These wings are secured by bolts 66 onto opposite mounting structures 68, 70 which mounting structures are preferably electrically isolated from the remainder of the tube mill A. It is appreciated that the short circuit ring could be a coil of wires or another highly conductive, annular member positioned between the inductors 30, 40.

In operation, it is appreciated that the low resistivity, short circuit ring 60 forms a low resistance band around the skelp B directly below the ring. The function of this low resistivity band is illustrated in FIGURE 2 wherein the welding current $a$ induced into the skelp by inductor 30 is caused to flow around the skelp B instead of longitudinally along the skelp toward the inductor 40. In like manner, the current $b$ which is induced into the skelp B by the preheating inductor 40 does not tend to progress longitudinally into the vicinity of the inductor 30 because the current $b$, when reaching the low resistivity band around skelp B, flows around the skelp in a manner similar to the welding current $a$. It is appreciated that the provision of the short circuit ring 60 does not require a substantial amount of space and the inductors 30, 40 can be spaced only slightly without preventing the insertion of the ring 60 therebetween. In this manner, the welding current $a$ does not tend to damage the preheating inductor 40 and the preheating current $b$ does not flow within the general vicinity of the welding inductor 30. By this arrangement the disadvantages described above are completely eliminated.

It is appreciated that the present invention has been described in connection with a preferred embodiment and that certain structural changes may be made in this preferred embodiment without departing from the intended spirit and scope of tht present invention as defined by the appended claims.

Having thus described by invention, I claim:

1. In a welding mill of the type adapted to form tubing by welding the converging edges of an advancing skelp, comprising a welding inductor adjacent the point of convergence of said edges and a preheating inductor adjacent said edges and in advance of said welding inductor, the improvement comprising: means for forming a low resistance path across said edges and between said inductor, said means including a low resistivity ring surrounding said skelp and between said inductors.

2. The improvement as defined in claim 1 wherein said ring is formed from copper.

3. In a welding mill of the type adapted to form tubing by welding the converging edges of an advancing skelp, comprising a welding inductor adjacent the point of convergence of said edges and a preheating inductor adjacent said edges and in advance of said welding inductor, the improvement comprising: means for forming a low resistivity band around said advancing skelp which band extends between said edges.

4. A welding mill of the type adapted to form tubing by welding the converging edges of an advancing skelp comprising a welding inductor adjacent the point of convergence of said edges, a high frequency power supply for driving said welding inductor, a preheating inductor adjacent said edges and in advance of said welding inductor, a high frequency power supply for driving said preheating inductor at a frequency substantially lower than the frequency of said first-mentioned power supply, and means between said inductors for preventing flow of induced current at said lower frequency in the vicinity of said welding inductor and flow of induced current at said higher frequency in the vicinity of said preheating inductor, said means including a low resistivity ring surrounding said skelp and between said inductors.

References Cited by the Examiner

UNITED STATES PATENTS 2,965,740   12/1960   McConnell _____ 219—8.5

FOREIGN PATENTS 716,378   10/1954   Great Britain.

RICHARD M. WOOD, *Primary Examiner.*